US012747713B2

(12) United States Patent
MacKenzie

(10) Patent No.: US 12,747,713 B2
(45) Date of Patent: Sep. 29, 2026

(54) MULTI-PART PISTON CONSTRUCTION FOR AN OPPOSED-PISTON ENGINE

(71) Applicant: General Atomics Aeronautical Systems, Inc., San Diego, CA (US)

(72) Inventor: Ryan G. MacKenzie, San Diego, CA (US)

(73) Assignee: General Atomics Aeronautical Systems, Inc., San Diego, CA (US)

( * ) Notice: Subject to any disclaimer, the term of this patent is extended or adjusted under 35 U.S.C. 154(b) by 304 days.

(21) Appl. No.: 18/342,592

(22) Filed: Jun. 27, 2023

(65) Prior Publication Data

US 2023/0340924 A1 Oct. 26, 2023

Related U.S. Application Data

(63) Continuation of application No. 16/556,106, filed on Aug. 29, 2019, now abandoned, which is a (Continued)

(51) Int. Cl.
*F02F 3/00* (2006.01)
*B23K 26/28* (2014.01)
(Continued)

(52) U.S. Cl.
CPC .............. *F02F 3/003* (2013.01); *B23K 26/28* (2013.01); *B23P 15/10* (2013.01); *F02B 75/282* (2013.01);
(Continued)

(58) Field of Classification Search
CPC ....... F02B 75/282; F02F 3/003; F02F 3/0015; F02F 2003/0061; F02F 2200/00; B23K 26/28; B23P 15/10
See application file for complete search history.

(56) References Cited

U.S. PATENT DOCUMENTS 1,796,603 A 3/1931 Junkers
3,703,126 A 11/1972 Haug ...................... F01B 31/08
(Continued)

FOREIGN PATENT DOCUMENTS

DE 658292 C 3/1938
FR 1337311 A 9/1963
(Continued)

OTHER PUBLICATIONS

ISR/Written Opinion, PCT No. PCT/US2018/025557, mailed Jul. 4, 2018.

(Continued)

*Primary Examiner* — Bayan Salone

(74) *Attorney, Agent, or Firm* — Knobbe, Martens, Olson & Bear, LLP

(57) ABSTRACT

A piston for an internal combustion opposed-piston engine includes a crown part, a skirt part, and an outer part. The crown part includes a first ring belt region for supporting compression rings and an end surface shaped to form a combustion chamber with an end surface of an opposing piston. The skirt part includes a sidewall and a wristpin bore with a first opening and a second opening formed in the sidewall. The outer part includes a second ring belt region for supporting oil control rings. The crown part is joined to an upper end of the sidewall with one or more welding seams. The outer part is joined to a lower end of the sidewall with a welding seam.

16 Claims, 11 Drawing Sheets

Related U.S. Application Data continuation of application No. PCT/US18/25557, filed on Mar. 30, 2018.

(60) Provisional application No. 62/478,932, filed on Mar. 30, 2017.

(51) Int. Cl.
*B23P 15/10* (2006.01)
*F02B 75/28* (2006.01)

(52) U.S. Cl.
CPC ... *F02F 2003/0061* (2013.01); *F02F 2200/00* (2013.01)

(56) References Cited

U.S. PATENT DOCUMENTS

| | | | | |
|---|---|---|---|---|
| 6,209,510 | B1 * | 4/2001 | Brogdon | F02F 3/0015 123/197.2 |
| 6,637,642 | B1 | 10/2003 | Lingnau | B23K 20/12 |
| 7,005,620 | B2 * | 2/2006 | Ribeiro | F02F 3/003 219/635 |
| 8,161,934 | B2 | 4/2012 | Scharp et al. | F02F 3/00 |
| 8,286,852 | B2 | 10/2012 | Kolbe et al. | B23K 20/12 |
| 8,327,537 | B2 | 12/2012 | Ribeiro | B23P 15/10 |
| 8,434,400 | B2 | 5/2013 | Kemnitz et al. | F01B 31/08 |
| 8,544,442 | B2 | 10/2013 | Scharp et al. | B23P 15/10 |
| 8,671,905 | B2 | 3/2014 | Scharp et al. | F02F 3/00 |
| 8,800,528 | B2 | 8/2014 | Fuqua et al. | F02F 3/24 |
| 9,038,593 | B1 | 5/2015 | Kessler et al. | F02B 75/28 |
| 9,163,505 | B2 | 10/2015 | Dion et al. | |
| 9,175,725 | B2 | 11/2015 | Dion et al. | F16J 1/14 |
| 9,243,709 | B2 | 1/2016 | Lapp et al. | F16J 1/005 |
| 9,470,136 | B2 | 10/2016 | Mackenzie | F02F 3/18 |
| 9,759,119 | B2 | 9/2017 | Mackenzie et al. | F01P 3/10 |
| 10,619,594 | B2 * | 4/2020 | John | F02M 61/14 |
| 2010/0282219 | A1 * | 11/2010 | Alonso | F02B 75/282 123/51 AA |
| 2012/0073526 | A1 * | 3/2012 | Dion | F01B 7/08 123/193.6 |
| 2012/0240881 | A1 | 9/2012 | Scharp et al. | F01P 1/04 |
| 2013/0213342 | A1 | 8/2013 | Burton et al. | F02F 3/26 |
| 2014/0014063 | A1 * | 1/2014 | Redon | F02B 23/0621 123/295 |
| 2014/0083396 | A1 | 3/2014 | Burton et al. | F02B 75/28 |
| 2014/0202404 | A1 | 7/2014 | Weinenger et al. | F02F 3/28 |
| 2014/0260960 | A1 | 9/2014 | Lapp et al. | F16J 1/005 |
| 2015/0059682 | A1 * | 3/2015 | Weinenger | F02F 3/003 123/193.6 |
| 2015/0122212 | A1 | 5/2015 | Riffe et al. | F02F 3/00 |
| 2015/0122227 | A1 | 5/2015 | Abani et al. | F02B 71/00 |
| 2016/0201544 | A1 | 7/2016 | Mackenzie et al. | F01P 3/10 |
| 2016/0290224 | A1 | 10/2016 | Abani et al. | F02B 75/02 |
| 2017/0030262 | A1 | 2/2017 | Venugopal | F02B 75/28 |
| 2017/0370273 | A1 | 12/2017 | Mackenzie | F01P 3/10 |
| 2018/0283315 | A1 * | 10/2018 | John | F02B 23/0693 |
| 2020/0191090 | A1 | 6/2020 | Mackenzie | F02F 3/22 |

FOREIGN PATENT DOCUMENTS

| | | |
|---|---|---|
| WO | WO-2016/032708 A2 | 3/2016 |
| WO | WO-2018/183954 A1 | 10/2018 |

OTHER PUBLICATIONS

Appeal Brief, U.S. Appl. No. 16/556,106, submitted Jun. 23, 2022.
Examiner's Answer, U.S. Appl. No. 16/556,106, mailed Jul. 26, 2022.
Reply Brief, U.S. Appl. No. 16/556,106, submitted Sep. 19, 2022.
BPAI Decision, U.S. Appl. No. 16/556,106, mailed May 1, 2023.
Gabriel, D. and Hettich, T.: "TopWeld® Steel Piston for High Speed Diesel Engines", SAE Technical Paper 2015-01-1723, Apr. 14, 2015.
Induction Preheat and Postheat, https://ultraflexpower.com/induction-heating-applications/preheat-and-postheat/.
Decision in *Virtek Vision Int'l ULC* v. *Assembly Guidance Systems, Inc.*, Case No. 22-1998 (Fed. Cir. Mar. 27, 2024).

* cited by examiner

MULTI-PART PISTON CONSTRUCTION FOR AN OPPOSED-PISTON ENGINE

PRIORITY

This application is a continuation of U.S. application Ser. No. 16/556,106, filed Aug. 29, 2019, which is a continuation of PCT application PCT/US2018/025557, filed Mar. 30, 2018, which claims priority to U.S. 62/478,932, filed Mar. 30, 2017.

RELATED APPLICATIONS

This application contains subject matter related to the subject matter of the following patent applications: U.S. patent application Ser. No. 13/136,955, filed Aug. 15, 2011, for "Piston Constructions for Opposed-Piston Engines," now U.S. Pat. No. 9,163,505, issued on Oct. 20, 2015; U.S. patent application Ser. No. 13/776,656, filed Feb. 25, 2013, for "Rocking Journal Bearings for Two-Stroke Cycle Engines," now U.S. Pat. No. 9,175,725, issued on Nov. 3, 2015; U.S. patent application Ser. No. 14/075,926, filed Nov. 8, 2013, for "Lubricating Configuration For Maintaining Wristpin Oil Pressure In A Two-Stroke Cycle, Opposed-Piston Engine," now U.S. Pat. No. 9,038,593, issued on May 26, 2015; U.S. patent application Ser. No. 14/199,877, filed Mar. 6, 2014, for "Piston Cooling Configurations Utilizing Lubricating Oil From a Bearing Reservoir in an Opposed-Piston Engine," now U.S. Pat. No. 9,470,136, issued on Oct. 18, 2016; U.S. patent application Ser. No. 14/596,855, filed Jan. 14, 2015, for "Piston Cooling for Opposed-Piston Engines", published as U.S. 2016/0201544, now U.S. Pat. No. 9,759,119, issued on Sep. 12, 2017; and, U.S. patent application Ser. No. 15/687,368, filed Aug. 25, 2017, for "Piston Cooling for Opposed-Piston Engines", published as U.S. 2017/0370273 on Dec. 28, 2017.

FIELD

The field is piston constructions for internal combustion engines. More specifically the invention relates to construction of a piston of an opposed-piston engine, which implements a multi-part piston configuration having two ring belt regions.

BACKGROUND

Pistons of opposed-piston internal combustion engines are constructed differently than conventional pistons that form combustion chambers against a cylinder head. This is true particularly for opposed-piston engines in which the movements of the pistons control the opening and closing of the ports which allow charge air and exhaust to flow into and out of the engine's cylinders. As is described in greater detail in some of the related applications listed above, modifications to the pistons of opposed-piston engines can be made that allow for piston cooling, lubrication, and durability while aiming for reduced emissions and power performance goals.

In a two-stroke cycle, opposed-piston engine, there is at least one ported cylinder with a pair of pistons disposed for counter-moving operation in the cylinder's bore. To-and-fro sliding motion of the pistons in the cylinder is guided by the bore surface. In a compression stroke, the pistons approach each other to form a combustion chamber between their end surfaces in an intermediate zone of the bore. In a power stroke, the pistons move apart in response to a combustion event. As the pistons slide together and apart, sets of inner piston rings installed in the crowns of the pistons contact the bore surface to seal the combustion chamber, and sets of outer piston rings installed in the piston skirts, near outer ends of the skirts, contact the bore surface to control the transport of lubricating oil into and out of the cylinder. Piston movement enables the rings to spread lubricating oil over and across the surface of the bore for the purpose of reducing friction between the bore surface on one hand and the rings and skirts of the pistons on the other. Further, during a compression stroke, when the pistons are near top center (TC) locations in the cylinder, the outer rings are positioned between the intake and exhaust ports and the open ends of the cylinder, providing a seal that keeps crankcase gas, oil mist, and vapor from mixing with intake air and exhaust gas.

In some cases, the pistons are provided with a skirt configuration that presents a minimized contact area with the cylinder bore surface, which reduces piston/bore friction and piston mass to the benefit of engine performance and durability. The configuration is constituted of a narrowing of the skirt's waist along a wristpin axis, between the sets of inner and outer piston rings. The configuration widens to circumferentially-arranged ring belt portions in the crown and base of the skirt where grooves are formed to support the inner and outer ring sets, respectively. In other cases, it may be beneficial to increase the contact area between the piston skirt and the cylinder bore surface such that the skirt presents an outer surface that corresponds more completely in shape to the cylinder's bore surface. In such cases, the configuration of the skirt's outer surface may have the shape of a cylindrical surface with no narrowing of the skirt's waist along the cylindrical surface, between the inner and outer ring sets.

Each piston may be manufactured from separate parts that include a crown and a skirt which are joined using conventional techniques. Typically, the crown and skirt parts comprise weldable materials, such as steel, that are manufactured by casting, forging, or equivalent processes in which various internal and external structures are formed. The internal structures include circumferentially-extending joining surfaces in the crown and skirt where the parts are connected by means of welding.

In some aspects, including the skirt configuration with a minimized contact area, manufacture of the skirt part by forging may present problems with respect to formation of the second ring belt for the outer piston rings. If a second ring belt is included in the forged part, the wall thickness of the skirt must be substantial enough to meet the radial width requirements of the ring belt. But, all else being equal, a piston with a thick skirt wall is more massive than one with a thin skirt wall, which can adversely affect engine performance and efficiency. Additional machining of the forged skirt portion to reduce wall thickness adds cost and time to piston construction that may not be justified in mass production. Accordingly, there is a need for a piston construction in a two-stroke opposed-piston engine that affords a thin skirt wall while supporting an outer ring belt region.

On the other hand, when it is beneficial to maximize the contact area between the piston skirt and cylinder bore, manufacturability may be improved due to elimination of the transition in wall thickness between the second ring belt and the skirt. Accordingly, there is a need for a piston construction in a two-stroke opposed-piston engine that affords a thicker skirt wall while supporting an outer ring belt region.

SUMMARY

In either case, a unique construction is realized in a multi-part piston of a two-stroke cycle, internal combustion engine in which a crown part has a first circumferential ring belt region, a skirt part has a sidewall with a first and second ends, and an outer part has a second circumferential ring belt region, wherein the crown part is joined to the first end of the skirt part by two or more first weld seams and the outer part is joined to the second end of the skirt part by a second weld seam.

In some implementations, a piston of a two-stroke cycle, opposed-piston engine is provided in which the piston includes a crown part and a skirt part with an outer skirt portion. The crown part includes an end surface with a bowl means shaped for forming a combustion chamber with the end surface of an opposing piston, and an annular compression ring belt region. The skirt part includes a sidewall that defines a piston longitudinal axis, and a wristpin bore with spaced-apart bore openings formed in the sidewall and aligned along a longitudinal wristpin bore axis that intersects the piston axis. Two or more inner weld seams join the crown part and a first end of the skirt part. The outer skirt portion includes an annular oil ring belt region. An outer weld seam joins the outer skirt portion to a second, open end of the sidewall.

In some implementations, a piston of a two-stroke cycle, opposed-piston engine is provided in which the piston includes a crown part and a skirt part with an outer skirt portion. The crown part includes an end surface with a bowl means shaped for forming a combustion chamber with the end surface of an opposing piston, and an annular compression ring belt region. The skirt part includes a sidewall that defines a piston longitudinal axis, and a wristpin bore with spaced-apart bore openings formed in the sidewall and aligned along a longitudinal wristpin bore axis that intersects the piston axis. Two or more inner weld seams join the crown part and a first end of the skirt part. The outer skirt portion includes an annular oil ring belt region. An outer weld seam joins the outer skirt portion to a second, open end of the sidewall.

In some aspects, the crown part includes a first interior wall means for defining an upper surface of a circumferential cooling gallery and the inner portion of the skirt part includes second interior wall means for defining a lower surface of the circumferential cooling gallery.

In some other aspects, the bowl means has an axis extending between a pair of diametrically-opposed, shaped openings in a periphery of the end surface that can be oriented to the longitudinal wristpin bore axis with a predetermined angle between the two axes.

Further, in another related aspect, a method for making a piston for an opposed-piston engine is provided, in which the method includes providing a crown part, providing a skirt part, providing an outer part, welding the crown part and skirt part together, and welding the outer part and the skirt part together. The provided piston crown part includes a sidewall with a first ring belt region. The skirt part includes a wristpin bore with a longitudinal wristpin bore axis. The following may be present in the method in any suitable combination. Welding the crown part and skirt part together can include orienting the combustion chamber forming means axis to the longitudinal wristpin bore axis with a predetermined angle between the two axes. The method can include transforming a piece of metal using forging to create the crown part, the skirt part, and/or the outer part of the piston. Welding the crown part and skirt part together can include one or more of friction welding, shielded active gas welding, shielded metal arc welding, gas tungsten arc welding, gas metal arc welding, flux-cored welding, submerged arc welding, electroslag welding, electric resistance welding, magnetic pulse welding, and other equivalent welding processes. Welding the skirt part and the outer part together can include one or more of friction welding, shielded active gas welding, shielded metal arc welding, gas tungsten arc welding, gas metal arc welding, flux-cored arc welding, submerged arc welding, electroslag welding, electric resistance welding, laser beam welding, and electron beam welding. Welding the crown part and skirt part together can include induction heating of the crown part and the skirt part. Welding the skirt part and the outer part together can include induction heating of the skirt part and the outer part. In the method, the crown part can include an end surface with bowl means shaped for forming a combustion chamber with an end surface of an opposing piston in a cylinder of an opposed-piston engine, and the combustion chamber can include an injection axis. In such methods, welding the crown part and the skirt part together can include orienting the combustion chamber forming means injection axis to the longitudinal wristpin bore axis with a predetermined angle between the two axes.

DETAILED DESCRIPTION

The multi-part piston embodiments described and illustrated herein are improvements and modifications of piston designs for two-stroke cycle engines, opposed-piston engines for example. Also described are methods for fabrication and use of the modified piston configurations.

A two-stroke cycle engine is an internal combustion engine that completes an operating cycle with a single complete rotation of a crankshaft and two strokes of a piston connected to the crankshaft. One example of a two-stroke cycle engine is an opposed-piston engine in which two pistons are disposed in opposition in the bore of a cylinder. During engine operation, combustion takes place in a combustion chamber formed in the bore between the end surfaces of the two pistons when the pistons move through respective top center locations in the bore. When used herein, the term "combustion chamber" refers to the minimum volume within the cylinder that is bounded by the end surfaces of the pistons and the annular portion of the bore between the end surfaces during operation of the engine in each cycle of engine operation.

Figure 1:
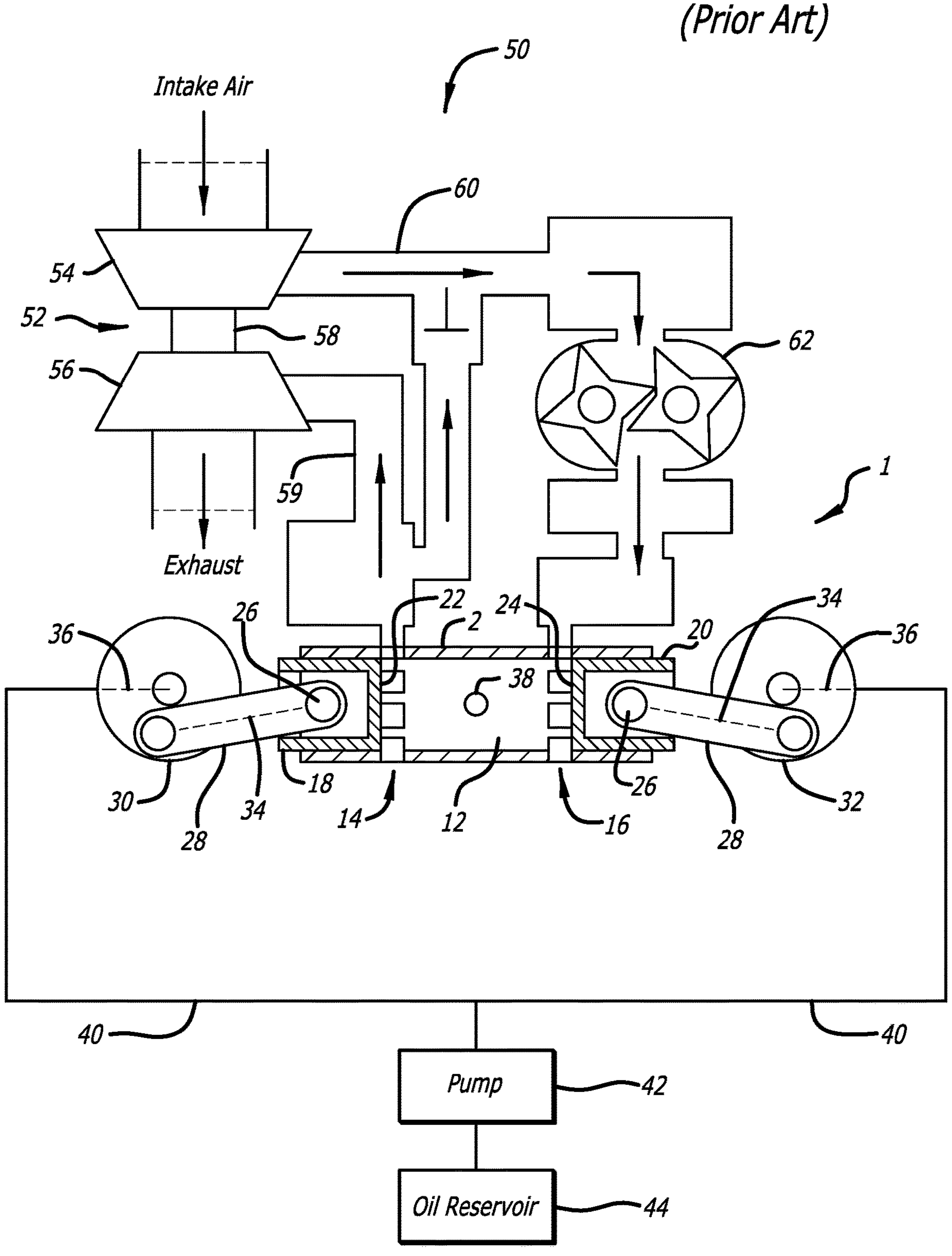
FIG. 1 (Prior Art)
FIG. 1 shows a schematic drawing of a prior art opposed-piston engine.

As seen in FIG. 1, an opposed-piston engine 1 has at least one ported cylinder 2. For example, the engine may have one ported cylinder, two ported cylinders, three ported cylinders, or four or more ported cylinders. For purposes of illustration, the engine 1 is presumed to have a plurality of ported cylinders. Each cylinder 2 has a bore 12. Exhaust and intake ports 14 and 16 are formed in respective ends of the cylinder such that the exhaust port 14 is longitudinally separated from the intake port 16. Each of the exhaust and intake ports 14 and 16 includes one or more circumferential arrays of openings. Exhaust and intake pistons 18 and 20 are slidably disposed in the bore 12 with their end surfaces 22 and 24 opposing one another. The exhaust pistons 18 are coupled to a crankshaft 30, and the intake pistons 20 are coupled to a crankshaft 32. Each of the pistons is coupled to its associated crankshaft by a bearing assembly 26 and a connecting rod 28. For this disclosure, a cylinder may comprise a boring or a formed space in an engine block, or a liner (or sleeve) retained in a tunnel in an engine block.

In the engine shown in FIG. 1, a lubrication system that supplies oil to lubricate the moving parts of the engine 1 includes an oil reservoir 44 from which pressurized oil is pumped by a pump 42 to a main gallery 40. The main gallery 40 supplies pressurized oil to the crankshafts 30 and 32, typically through drillings 36 to the main bearings (not seen). From grooves in the main bearings, pressurized oil is provided to grooves in the big end bearings of the connecting rods 28. From there, pressurized oil flows through drillings 34 in the connecting rods to the bearings 26. Such a lubrication system may be present in the engine 1 but should not be considered to be limiting with respect to the description of the opposed-piston engine or any of its components.

The operational cycle of an opposed-piston engine is well understood. In response to combustion occurring between their end surfaces 22, 24, the opposed pistons 18 and 20 move away from respective top center (TC) locations in the cylinder. While moving from TC, the pistons keep their associated ports closed until they approach respective bottom center (BC) positions. The pistons may move in phase so that the exhaust and intake ports 14, 16 open and close in unison; alternatively, one piston may lead the other in phase, in which case the intake and exhaust ports have different opening and closing times. As the pistons move through their BC locations exhaust products flowing out of the exhaust port 14 are replaced by charge air flowing into the cylinder through the intake port 16. After reaching BC, the pistons reverse direction and the ports are again closed by the pistons. While the pistons continue moving toward TC, the charge air in the cylinder 2 is compressed between the end surfaces 22 and 24. Each end surface is shaped for forming a combustion chamber with the adjacent end surface of the opposing piston. As the pistons advance to their respective TC locations in the cylinder bore, fuel is injected directly through the cylinder sidewall by nozzles 38, into compressed charge air. The mixture of charge air and fuel is compressed in the combustion chamber formed between the end surfaces 22 and 24 of the pistons 18 and 20. When the mixture reaches an ignition temperature, the fuel ignites. Combustion results, driving the pistons apart, toward their respective BC locations.

Figure 2A:
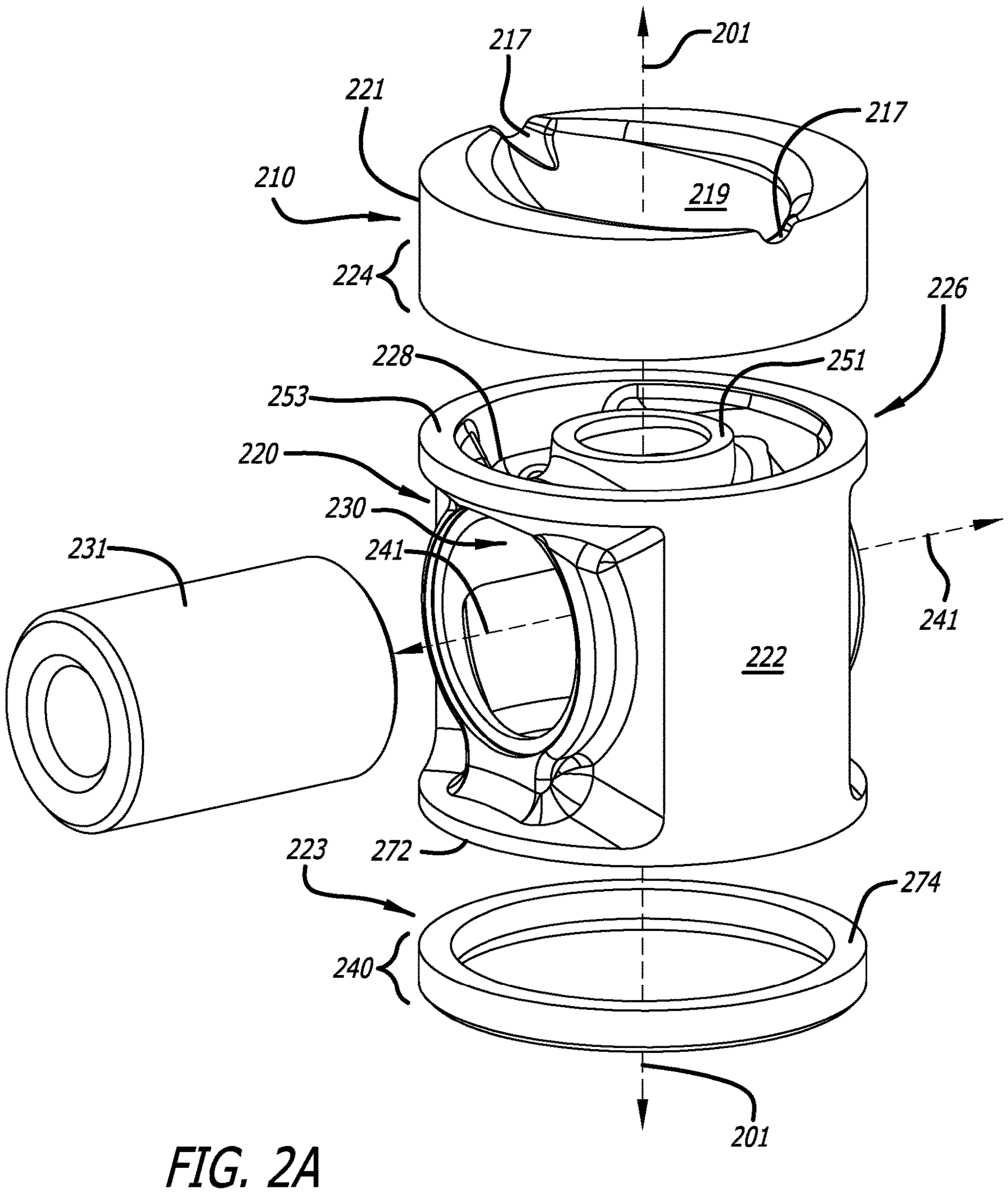
FIG. 2A is an exploded isometric view of an exemplary multi-part piston showing separate crown, skirt, and outer parts that are to be joined together by welding.
Figure 2B:
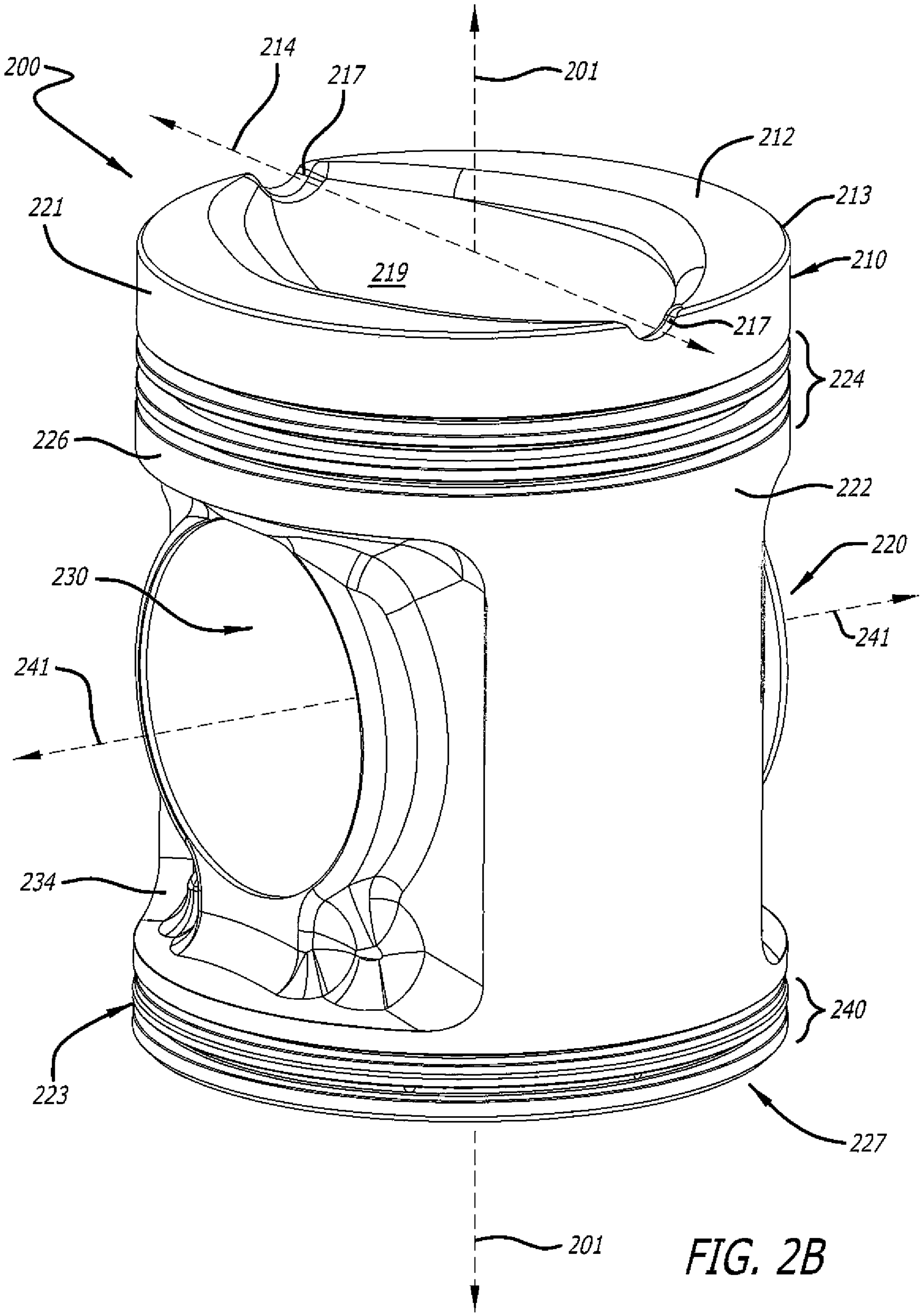
FIG. 2B is an isometric view that shows the exemplary multi-part piston assembled for use in an opposed-piston engine.

Piston Construction: FIGS. 2A and 2B show a piston 200 for an opposed-piston engine constructed according to this disclosure. FIG. 2A shows three separate parts that are joined by welding or an equivalent process to yield the assembled piston shown in FIG. 2B. A wristpin is shown in some of these drawings for a clearer understanding of certain construction features of the piston but is not intended to limit the scope of this disclosure. A piston 200 with a longitudinal axis 201 comprises a crown part 210, a skirt part 220 with a piston sidewall 222, and an outer part 223. The piston 200 is configured so that the skirt part 220 is between the crown part 210 and the outer 223 part along the piston's longitudinal axis 201. The crown part 210 and the skirt part 220 are joined by welding circumferentially-extending joining surfaces of the crown and skirt parts at one end of the sidewall 222. The outer part 223 and the skirt part are joined by welding circumferentially-extending joining surfaces of the skirt and outer parts at an opposite end of the sidewall 222.

The crown part 210 has an end surface 212 shaped to define a combustion chamber with the end surface of an opposing piston in the engine. In the end surface 212, there is a bowl 219 and notches 217 which open into the bowl through the peripheral edge 213 of the crown part. The notches 217 are shaped to guide entry of fuel into the combustion chamber. In this example, the notches 217 are spaced along the longitudinal axis 214 of the bowl, so as to be situated at diametrically opposed locations on the peripheral edge 213. The bowl's axis 214 is collinear with a combustion chamber injection axis with reference to which fuel is injected. The shape of the end surface 212 shown in FIGS. 2A and 2B limits the scope of this disclosure only to the extent that it cooperates with the end surface of an opposing piston to define a shape of a combustion chamber in an opposed-piston engine with direct side injection by at least two injectors. Many other such end surface shapes are possible; see, for example, and without limitation, the end surface shapes for pistons of opposed-piston engines that are described and illustrated in U.S. Pat. No. 8,800,528, US publication 2013/0213342, WO publication 2012/158756, US publication 2014/0014063, US publication 2015/0122227, US publication 2016/0290224, and US publication 2017/0030262.

With reference to FIGS. 2A, 2B, 3, and 4, a land 221 occupying an external circumferential side surface of the crown part 210 meets the end surface 212 at the peripheral edge 213. A first circumferential ring belt region 224 adjoins the land. In some preferred cases, the piston 200 is assembled before ring grooves are formed in the belt region 224, as suggested by FIG. 2A. In other cases, the belt region 224 may be grooved before assembly of the piston. In any case, when the piston 200 is fully assembled, the ring belt region 224 comprises a plurality of ring grooves in which compression rings (not shown) are seated. In some instances, a ring groove may also be provided in the ring belt region 224 for an oil control ring. In this specification, the ring belt region 224 is referred to as an "inner ring belt region" because the piston rings which it supports ride in the innermost regions of a cylinder bore in a typical opposed-piston application. Because it supports compression rings which seal against the region of the cylinder bore surface where the combustion chamber is formed, the ring belt region 224 may also be termed the "compression ring belt region". The interior of the crown part 210 includes an undercrown 225. In some aspects, the undercrown 225 includes structures for defining cooling chambers.

Figure 3:
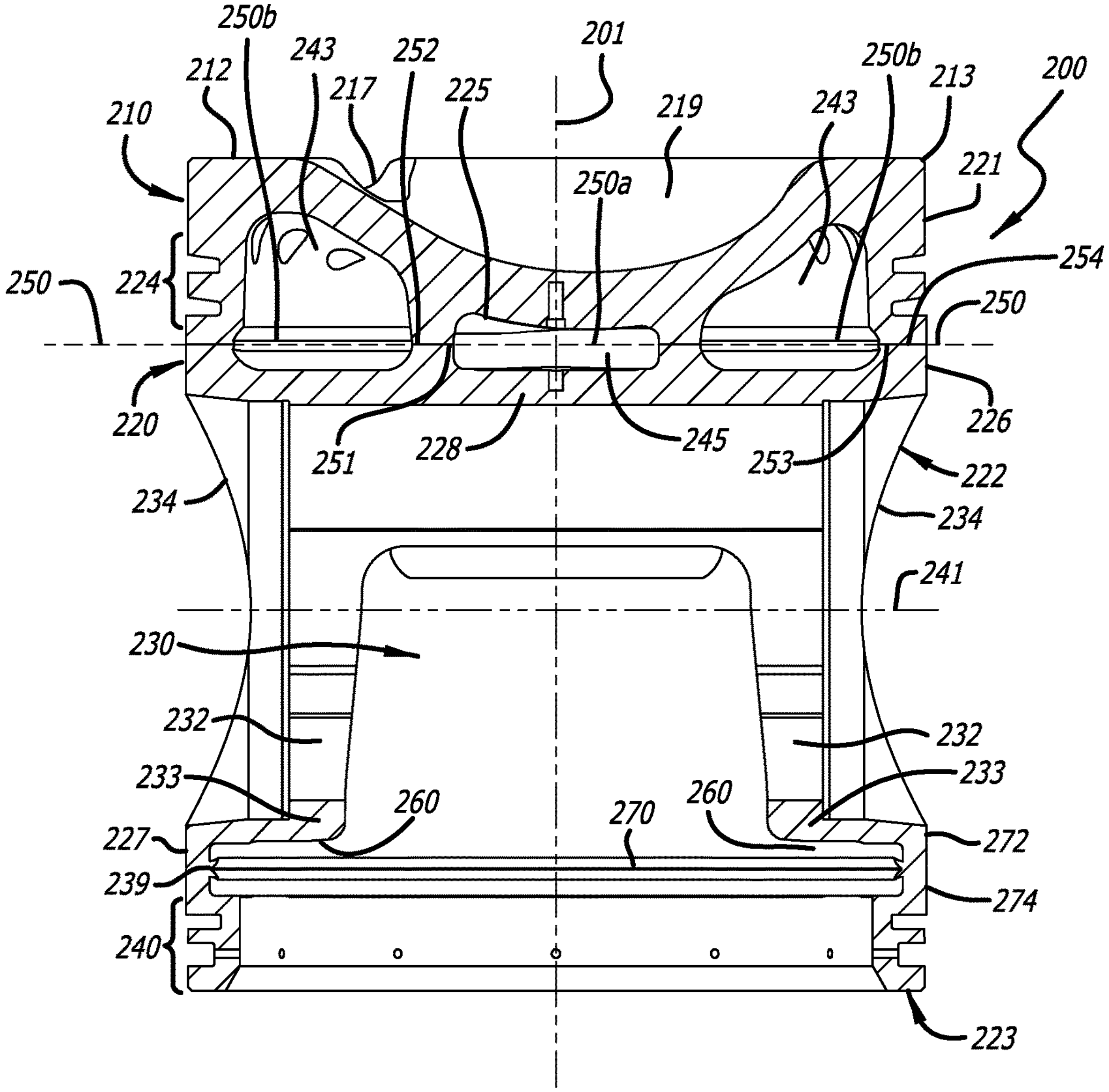
FIG. 3 is a side sectional view of the assembled piston of FIG. 2B taken along a wristpin bore axis of the piston.

The piston sidewall 222 is at least partially cylindrical and extends along the longitudinal axis 201 from a first end 226 to a second end 227 of the skirt part 220. The second end 227 is open. An interior wall 228 of the skirt that is centered on the longitudinal axis 201 is situated within the sidewall 222 near the first end 226. In some aspects the interior wall 228 includes support structures for a wristpin and other structures for defining cooling chambers. Preferably, but not necessarily, the interior wall 228 on one side defines a portion of a wristpin bore 230 where a wristpin 231 is received and retained. The wristpin bore 230 includes bore openings 232 formed in bosses 233 in the sidewall. The bore openings 232 are coaxially aligned along a common wristpin axis 241. The bosses 233 are formed in recesses 234 on the outer surface of the sidewall 222. As best seen in FIG. 3, the recesses 234 result in an hourglass-like narrowing of the sidewall 222 along the wristpin bore axis 241, which reduces friction between the sidewall and the cylinder bore surface as the piston moves during engine operation.

When the crown part 210 and the skirt part 220 are welded together, a circumferential cooling gallery 243 and a central cooling chamber 245 are defined between the interior wall 228 of the skirt part 220 and the undercrown 225. Here it can be seen that provision of the crown and skirt as separate pieces is a particularly useful technique of piston construction. It permits complex interior structures of the piston such as the wristpin bore 230, the cooling gallery 243, and the cooling chamber 245 to be realized by relatively simple forging or casting of portions of the structures in the separate undercrown 225 and interior wall 228, which are then brought together to define the interior structures when the crown part 210 and skirt part 220 are joined.

The outer part 223 is an essentially annular piece that comprises a land 239 occupying an external circumferential side surface of the outer part 223 that adjoins a second circumferential ring belt 240 region. In some preferred cases, the piston 200 is assembled before ring grooves are formed in the ring belt region 240 as suggested by FIG. 2A. In other cases, the ring belt region 240 may be grooved before assembly of the piston. In any case, the ring belt region 240 has a plurality of ring grooves in which oil control rings (not shown) are seated when the piston 200 is fully assembled. In this specification, the ring belt region 240 is referred to as an "outer ring belt region" because the piston rings which it supports ride in the outermost regions of a cylinder bore in a typical opposed-piston application. Because it supports oil rings which wipe oil from the outer cylinder bore surface in the outer ends of the cylinder, the ring belt region 240 may also be termed the "oil ring belt region".

Figure 4:
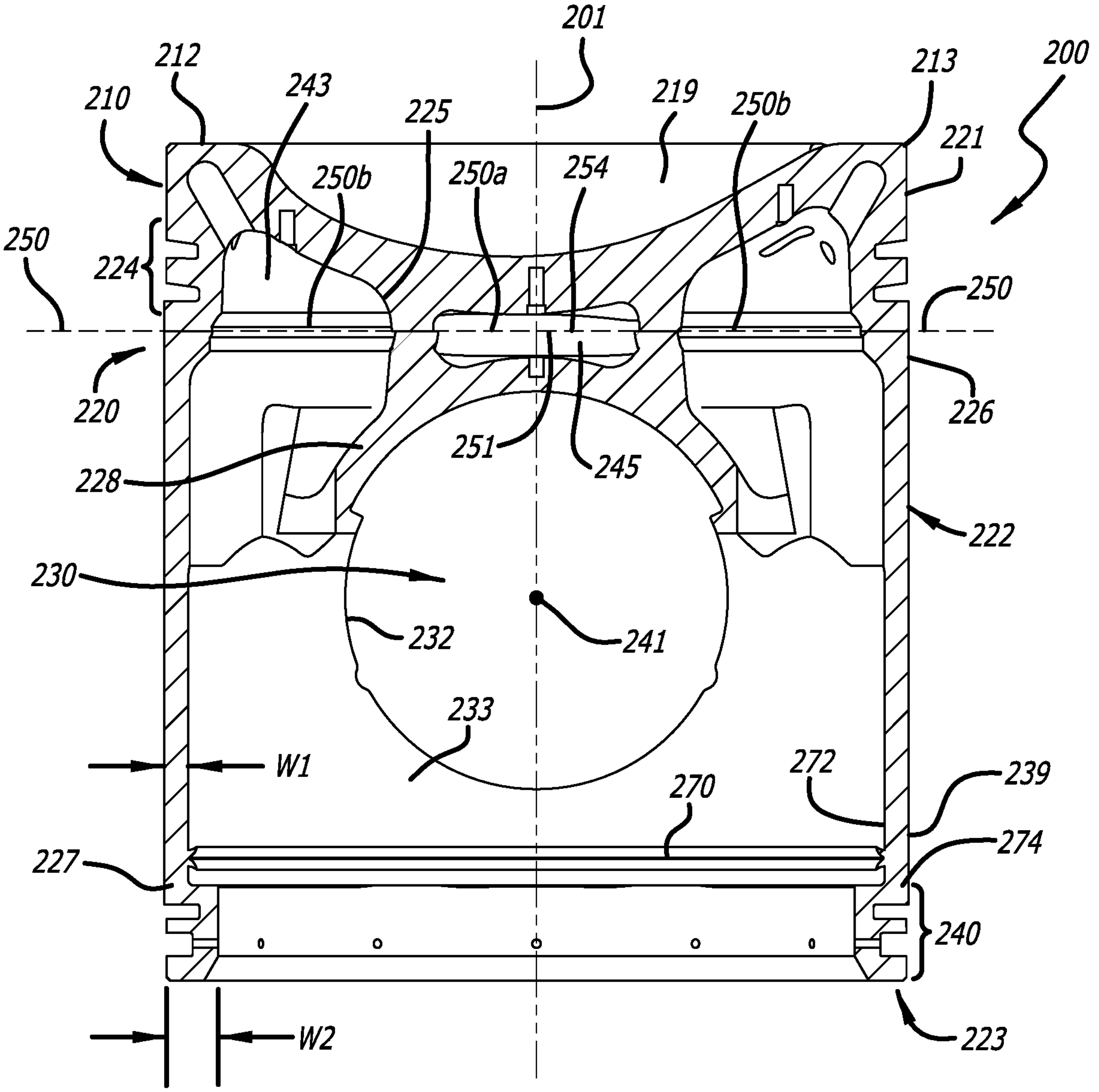
FIG. 4 is a side sectional view of the assembled piston of FIG. 2B taken transversely to the wristpin bore axis.

As shown in FIGS. 2B, 3, and 4, when the outer part 223 and the skirt part 220 are welded together, the outer ring belt region 240 defines an open outer end of the skirt part 220, and therefore, of the piston 200. With the piston 200 assembled by welding the crown part 210, skirt part 220, and outer part 223 together, the ring belt regions 224 and 240 occupy respective circumferential ends of the piston 200 that are coaxially aligned with and separated along the piston axis 201.

In FIGS. 3 and 4, a line 250 approximates preferred locations of first weld seams between the crown part 210 and the skirt part 220. The crown part 210 and the skirt part 220 can be joined (or, "connected") by one or more circumferential weld seams at circumferentially-extending joining surfaces in the vicinity of the line 250. In the example shown, there is an inner weld seam **250*a* between a radially inner circumferential surface 251 (best seen in FIG. 2A) on a circular rib extending from the interior wall 228 and a corresponding inner circumferential surface 252 on the undercrown 225. In the example shown, there is another inner weld seam 250*b* between a radially outer circumferential surface 253 (best seen in FIG. 2A) on a circular rib extending from the interior wall 228 and a corresponding outer circumferential surface 254 on the undercrown 225. Preferably, but not necessarily, the first weld seams 250*a* and 250*b* are aligned in a cut plane containing the line 250 which is orthogonal to the piston longitudinal axis 201** and are formed in the same welding step. However, other weld seam alignments and orientations are contemplated. Many techniques of welding crown and skirt parts using circumferential weld seams to form internal cooling galleries and cooling chambers are known. See, for example, U.S. Pat. No. 8,327,537 in this regard.

As seen in FIG. 3, near the second end 227 of the skirt part 220, on the interior surface of the sidewall 222 there are undercuts 260 that result from formation of the bosses 233 in the narrowed portion 234 of the sidewall 222. The narrowed potion 234 widens to the annular sections in the crown part 210 and the outer part 223 where grooves are formed in the inner and outer ring belt regions 224 and 240, respectively. The undercuts 260 would make it difficult to fabricate the skirt part 220 and the outer part 223 as a single, forged part. However, the undercuts 260 can be formed by manufacturing the skirt part 220 and the outer part 223 separately, by forging for example, with portions of the undercuts 260 formed in the two parts 220 and 223, and then welding the two parts 220 and 223 together along corresponding circumferentially-extending joining surfaces. In addition to simplifying the fabrication of the skirt part with the wristpin bore and the narrowed skirt portion 234, other advantages are gained.

In a first advantage, the outer part 223 can be manufactured as an annular piece, with circumferentially uniform symmetry, which eliminates a step of registration between the skirt part 220 and the outer part 223 when joined by welding.

A second advantage can be seen in FIG. 4, wherein the sidewall 222 can be made with a relatively thin radial width W1 in the non-narrowed portions of the skirt 222 by means of a forging step for example, so as to reduce the mass of the piston 200. In this regard the radial width W1 of the sidewall 222 in the non-narrowed portion is less than the radial width W2 of the second ring belt region 240.

With reference to FIGS. 3 and 4, the skirt part 220 and the outer part 223 are joined (or, "connected") by a second weld seam 270. The weld seam 270 is formed between a circumferentially-extending free end 272 of the skirt part 220 and a circumferentially-extending free end 274 of the outer part 223 (best seen in FIG. 2B). The free ends 272 and 274 have respective circumferentially-extending joining surfaces which are positioned in alignment and welded together, preferably by means of a friction welding process, although this is not intended to be limiting.

Figure 5:
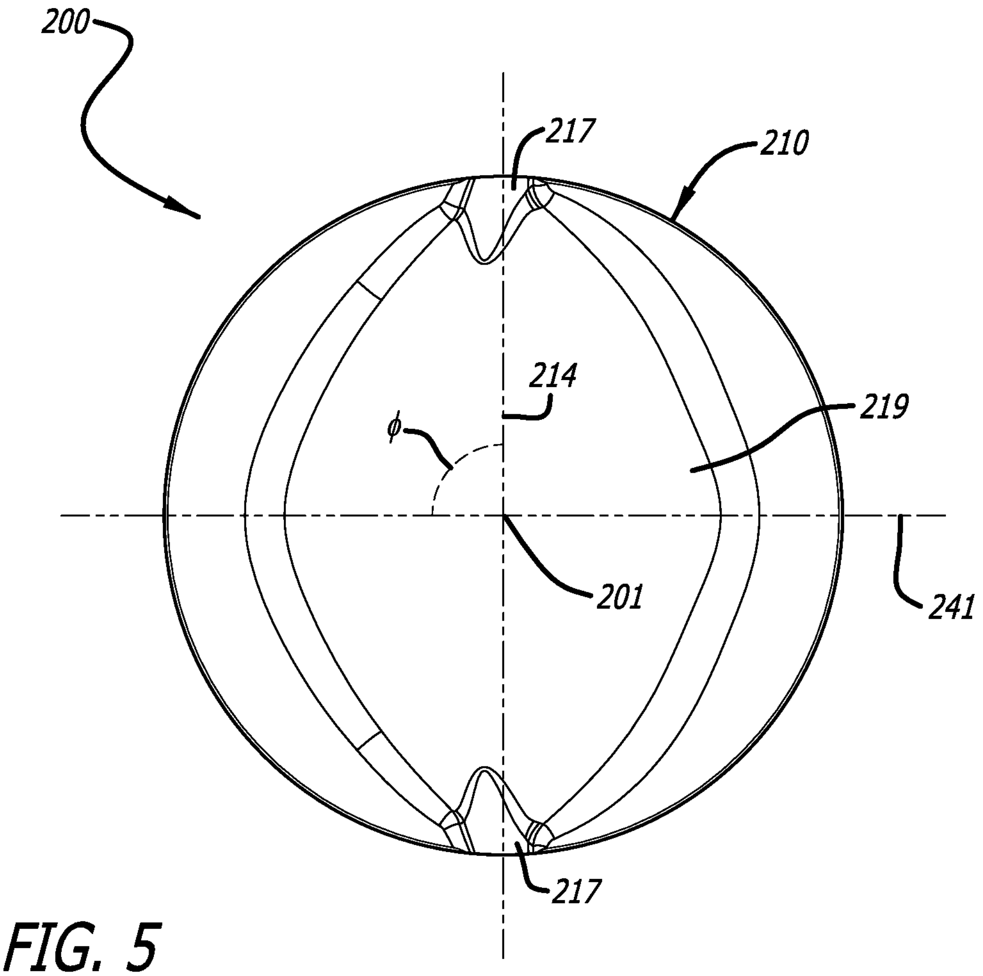
FIG. 5 is a plan view of a piston crown showing the orientation of a combustion chamber injection axis with respect to a wristpin bore axis.

In some aspects, which may be appreciated with respect to FIGS. 2A and 2B, the crown part 210 may have to be registered (or, "clocked") with respect to the skirt part 220 in preparation for making the first weld seams. For example, the crown part 210 may have to be positioned with respect to the skirt part 220 such that there is a predetermined orientation between the combustion chamber axis 214 and the wristpin bore axis 241 when the two parts are welded. In this instance, the diametrically-opposed notches 217, which are aligned along the axis 214, will have a particular orientation to the wristpin bore 230 and thus to the skirt part 220, which may be critical to the placement of fuel injectors in a cylinder block of an opposed-piston engine, depending on size and weight requirements. With reference to FIG. 5, the angle Ø between the combustion chamber injection axis 214 and the wristpin bore axis 241 can be between 30 degrees and 90 degrees. In some implementations, the angle Ø between the axes can be between 30 and 35 degrees; the angle Ø between the bowl axis 214 and the longitudinal wristpin bore axis 241 can be 32 degrees. Alternatively, depending on the configuration of other components in the engine, the angle Ø between the axes can be between 45 and 55 degrees; the angle Ø can be 58 degrees.

The piston 200 shown in FIGS. 2A, 2B, 3, and 4 may be fabricated from three or more forged parts that are finished, or partially finished, then joined (e.g., welded) as per FIGS. 3 and 4. The materials and methods of construction of the piston 200 may be conventional for medium and/or heavy duty use or for large bore applications. For example, the crown part 210 and the skirt part 220 may be formed separately of compatible materials (e.g., forged steel crown, cast iron skirt part) and joined by welding or brazing. Other materials can include laminated structures, hybrid structures, composite structures, and the like, including thermal barrier coatings, ceramic-metal composites (e.g., cermets), high-temperature metal alloys, laser ablated/structured surfaces, and the like.

In a piston for use in an opposed-piston engine, the crown part can include a forged metal base crown, with a shape including the bowl, undercrown and other features that can be nearly finished in dimension. Coatings may be applied to the surfaces of the forged base parts (i.e., the base crown part, the base skirt part, the base outer part). The coatings can be a thermal barrier coating, an oxidation prevention coating, an oil retention coating, and the like. Forged base parts can be designed to facilitate the forging process and to require little to no (i.e. minimal) machining and finishing after forging. The aforementioned coatings can be applied to the crown part, the skirt part, and the outer part either before or after welding these parts are together.

Forging metal parts, particularly steels, requires design considerations, known in the metal-working arts. Some of these design considerations include draft, or taper, in side walls and interior filets. Forged parts will also have distinct changes in the grain or crystal structure of the metal, and often times forging is used to impart strength characteristics to forged pieces that may not be present in machined or cast metal pieces.

The piston constructions described herein above can be combined with selection of materials that can allow for easier fabrication, lower costs, and/or lower weight without much, if any, sacrifice in piston performance. In some implementations, the crown part of a piston can include a metal or metal alloy that has high strength at high temperature. Additionally, or alternatively, the skirt and outer parts of a piston can include conventional piston materials. Materials that can be used in fabrication of the piston include: investment cast 4140 steel, stainless steel, investment cast 10xx carbon steel, sand cast steel, sand cast ductile iron, austempered ductile iron, sand cast compacted graphite iron, sand cast grey iron, any type of SAE graded steel, titanium, an Inconel alloy, a Hastelloy® alloy, or a combination thereof.

In implementations where the crown part of a piston is made of a different material than the skirt and outer parts, or where manufacturing can be simplified by fabricating the piston in multiple segments, one or more joining techniques can be used to assemble the piston. A welding technique used to join parts of a piston together per FIGS. 3 and 4 may include any of friction welding, shielded active gas welding, shielded metal arc welding, gas tungsten arc welding, gas metal arc welding, flux-cored arc welding, submerged arc welding, electroslag welding, and/or electric resistance welding. Additionally, or alternatively, induction heating of two parts to be joined can be used along with precise positioning of the two parts, particularly where precise relative positioning impacts the functioning of the opposed-piston engine, such as when the piston end surface has asymmetric features.

Material Example 1: Presume that a three-part piston is designed for an opposed-piston engine in which the end surface will experience peak cylinder pressures in excess of 200 bar. In order to achieve a durable, high strength construction, the crown part may be a forged piece comprising 4140 steel, the skirt part may be a forged piece comprising 4140 steel, and the outer part may be cut from tube stock comprising a weldable, wear resistant steel and machined to obtain the desired features. In some cases it may be desirable to forge the outer part from a piece comprising a weldable, wear resistant steel material.

Material Example 2: Presume that a three-part piston is designed for an opposed-piston engine in which the end surface will experience peak cylinder pressures less than or equal to 200 bar. In order to achieve a durable construction of appropriate strength, the crown part may be a forged piece comprising a microalloyed steel, the skirt part may be a forged piece comprising a microalloyed steel, and the outer part may be cut from tube stock comprising a weldable, wear resistant steel and machined to obtain the desired features. In some cases it may be desirable to forge the outer part from a piece comprising a weldable, wear resistant steel material.

Figure 6:
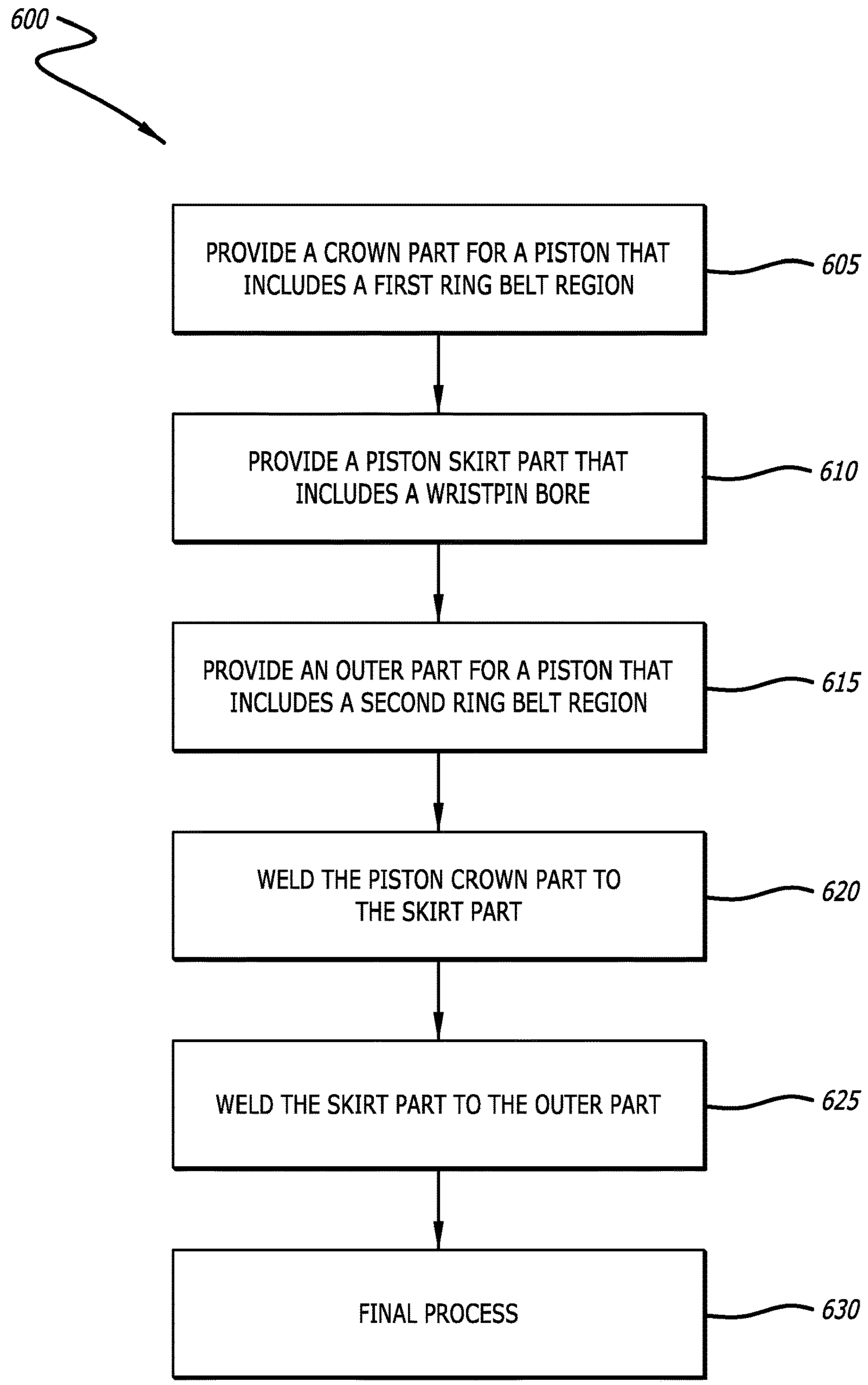
FIG. 6 shows a method for making a multi-part piston for use in an opposed-piston engine as described herein.

Manufacture: FIG. 6 shows a method 600 for making a piston for use in an opposed-piston engine as described herein. The method includes providing a crown part for a piston, as in 605. As described above, the crown part may be of a first material while the balance of the piston is of a second material, or two or more different materials. The crown part provided includes a first ring belt region (e.g., for accommodating compression ring grooves) and an end surface with a combustion forming means (e.g., a bowl). Preferably, the crown part is forged, followed by machining as required on a weld face of the undercrown.

A skirt part that includes a wristpin bore is provided in the method, as in 610. The material used to fabricate the crown part may be the same or different from that used to fabricate the skirt part. Preferably, the skirt part is forged, followed by machining as required on a weld face of the interior wall that will be joined to the weld face of the undercrown and on a weld face of the open end that will be joined to a weld face of the outer part.

Further, the method includes providing an outer part that includes a second ring belt region (e.g., for accommodating oil control ring grooves), as in 615. The outer part can be of the same material of the skirt part and/or of the crown part. Alternatively, the outer part can include a different material, a material that is not used in any other part of the piston. Preferably, the outer part is cut from tube stock comprising a weldable, wear resistant steel and machined to obtain the weld face that will be joined to the weld face at the open end of the skirt part.

The method includes welding the crown part to the skirt part, as in 620. In some instances, the crown part and the skirt part are registered with one another and then the crown part is welded to the skirt part. Preferably inner and outer weld seams are made to join the crown part and skirt part as seen in FIGS. 3 and 4 by means of one hybrid Induction weld operation.

Then, the skirt part is joined to the outer part by welding, as in 625. Welding can include induction heating and physical joining, as well as friction welding or electron beam welding. Further, the welding process (i.e., physical joining process) can involve a heat-treatment after welding to relieve stresses and/or heal cracks caused by the physically joining portions of the piston together. Preferably, the single weld seam is made to join skirt part and the outer part as seen in FIGS. 3 and 4 by means of an inertia friction welding operation.

Preferably, a final processing step 630 may include heat-treatment following the physical joining processes to allow for formation of desired materials phases and mixtures, particularly along the weld seams. Preferably, the processing step 630 includes machining the inner and outer ring bands to form ring grooves as required by design considerations. Additionally, the final processing step may include machining the skirt to form the wristpin bore openings.

Figure 7A:
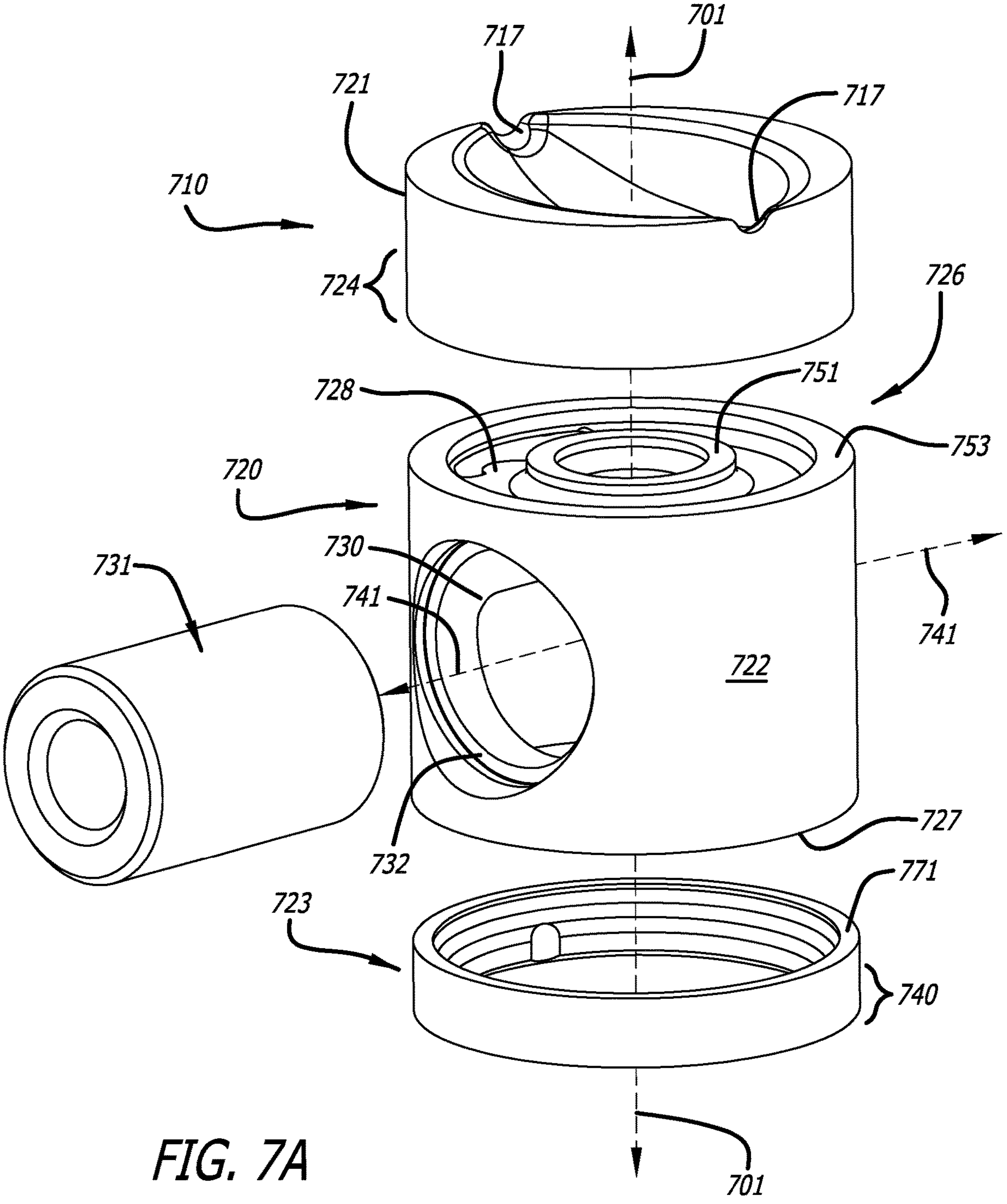
FIG. 7A is an exploded isometric view of another exemplary multi-part piston showing separate crown, skirt, and outer parts that are to be joined together by welding.
Figure 7B:
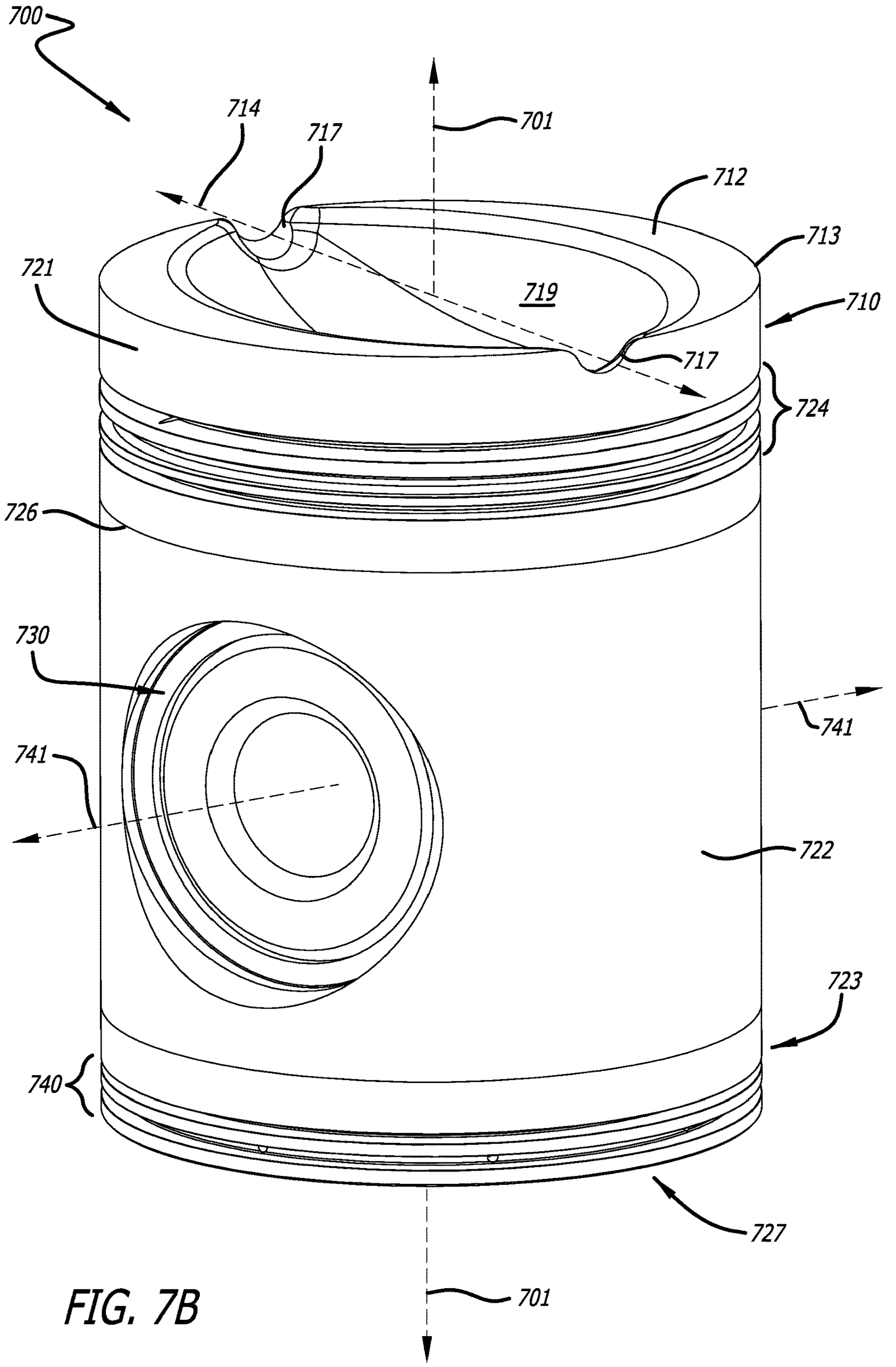
FIG. 7B is an isometric view that shows the exemplary multi-part piston assembled for use in an opposed-piston engine.

Second Piston Construction: There may be instances where certain aspects of the piston 200 (FIGS. 2A and 2B) limit its applicability. For example, the recesses 234 in the sidewall 222 where the bosses 233 are located may pose challenges related to manufacturability, durability, and operation of the piston in heavy duty applications. In these and other applications, it may be desirable to have a piston with somewhat more mass and symmetry, and a greater sidewall-to-cylinder-bore contact area, than the piston 200. For such instances, FIGS. 7A and 7B show another piston 700 for an opposed-piston engine constructed according to this disclosure. FIG. 7A shows three separate parts that are joined by welding to yield the assembled piston shown in FIG. 7B. A wristpin is shown in some of these drawings for a clearer understanding of certain construction features of the piston but is not intended to limit the scope of this disclosure. A piston 700 has a longitudinal axis 701, a crown part 710, a skirt part 720 with a piston sidewall 722, and an outer part 723. The piston 700 is configured so that the skirt part 720 is between the crown part 710 and the outer 723 part along the piston's longitudinal axis 701. The crown part 710 and the skirt part 720 are joined by welding circumferentially-extending joining surfaces of the crown and skirt parts at one end of the sidewall 722. The outer part 723 and the skirt part 720 are joined by welding circumferentially-extending joining surfaces of the skirt and outer parts at an opposite end of the sidewall 722.

The crown part 710 has an end surface 712 shaped to define a combustion chamber with the end surface of an opposing piston in the engine. In the end surface 712, there is a bowl 719 and notches 717 which open into the bowl through the peripheral edge 713 of the crown part. The notches 717 are shaped to guide entry of fuel into the combustion chamber. The bowl 719 has a major or longitudinal axis 714. In this example, the notches 717 are spaced along the longitudinal axis 714 of the bowl, so as to be situated at diametrically opposed locations on the peripheral edge 713. The bowl's axis 714 is collinear with a combustion chamber injection axis with reference to which fuel is injected. The shape of the end surface 712 shown in FIGS. 7A and 7B limits the scope of this disclosure only to the extent that it cooperates with the end surface of an opposing piston to define a shape of a combustion chamber in an opposed-piston engine with direct side injection by at least two injectors. Many other such end surface shapes are possible; see, for example, and without limitation, the end surface shapes for pistons of opposed-piston engines that are described and illustrated in the above-referenced US patents and publications.

With reference to FIGS. 7A, 7B, 8, and 9, a land 721 occupying an external circumferential side surface of the crown part 710 meets the end surface 712 at the peripheral edge 713. A first circumferential ring belt region 724 formed on the side surface of the crown part adjoins the land. In some preferred cases, the piston 700 is assembled before ring grooves are formed in the belt region 724, as suggested by FIG. 7A. In other cases, the belt region 724 may be grooved before assembly of the piston. In any case, when the piston 700 is fully assembled, the ring belt region 724 has a plurality of ring grooves in which compression rings (not shown) are seated. In some instances a ring groove may also be provided in the ring belt region 724 for an oil control ring. In this specification, the ring belt region 724 is referred to as an "inner ring belt region" because the piston rings which it supports ride in the innermost regions of a cylinder bore in a typical opposed-piston application. Because it supports compression rings which seal against the region of the cylinder bore surface where the combustion chamber is formed, the ring belt region 724 may also be termed the "compression ring belt region". The interior of the crown part 710 includes an undercrown 725. In some aspects, the undercrown 725 includes structures for defining cooling chambers.

The piston sidewall 722 is substantially cylindrical and extends along the longitudinal axis 701 from a first end 726 to a second end 727 of the skirt part 720. The second end 727 is open. An interior wall 728 of the skirt that is centered on the longitudinal axis 701 is situated within the sidewall 722 near the first end 726. In some aspects, the interior wall 728 includes support structures for a wristpin and other structures for defining cooling chambers. Preferably, but not necessarily, the interior wall 728 on one side defines a portion of a wristpin bore 730 where a wristpin 731 is received and retained. The wristpin bore 730 includes bore openings 732 formed in bosses 733 defined in the sidewall 722. The bosses 733 and bore openings 732 are coaxially aligned along a common wristpin axis 741. The openings 732 open through the sidewall 722 and are configured to receive a wristpin 731. As in FIGS. 7A, 7B, 8, and 9, the sidewall 722 presents a substantially cylindrical surface, without the narrowed waist portions 223 of the piston 200. In this regard, a "substantially cylindrical surface" means approximating a cylindrical surface, but not necessarily exactly cylindrical. For example, some degree of ovality may be provided in the overall shape of the sidewall and/or other portions of the piston.

When the crown part 710 and the skirt part 720 are welded together, a circumferential cooling gallery 743 and a central cooling chamber 745 are defined between the interior wall 728 of the skirt part 720 and the undercrown 725. Here it can be seen that provision of the crown and skirt as separate pieces is a particularly useful technique of piston construction. It permits complex interior structures of the piston such as the wristpin bore 730, the cooling gallery 743, and the cooling chamber 745 to be realized by relatively simple forging or casting of portions of the structures in the separate undercrown 725 and interior wall 728, which are then brought together to define the interior structures when the crown part 710 and skirt part 720 are joined.

The outer part 723 is an annular piece that comprises a land 739 occupying an external circumferential side surface of the outer part 723 that adjoins a second circumferential ring belt 740 region. In some preferred cases, the piston 700 is assembled before ring grooves are formed in the ring belt region 740 as suggested by FIG. 7A. In other cases, the ring belt region 740 may be grooved before assembly of the piston. In any case, the ring belt region 740 has a plurality of ring grooves in which oil control rings (not shown) are seated when the piston 700 is fully assembled. In this specification, the ring belt region 740 is referred to as an "outer ring belt region" because the piston rings which it supports ride in the outermost regions of a cylinder bore in a typical opposed-piston application. Because it supports oil rings which wipe oil from the outer cylinder bore surface in the outer ends of the cylinder, the ring belt region 740 may also be termed the "oil ring belt region".

Figure 8:
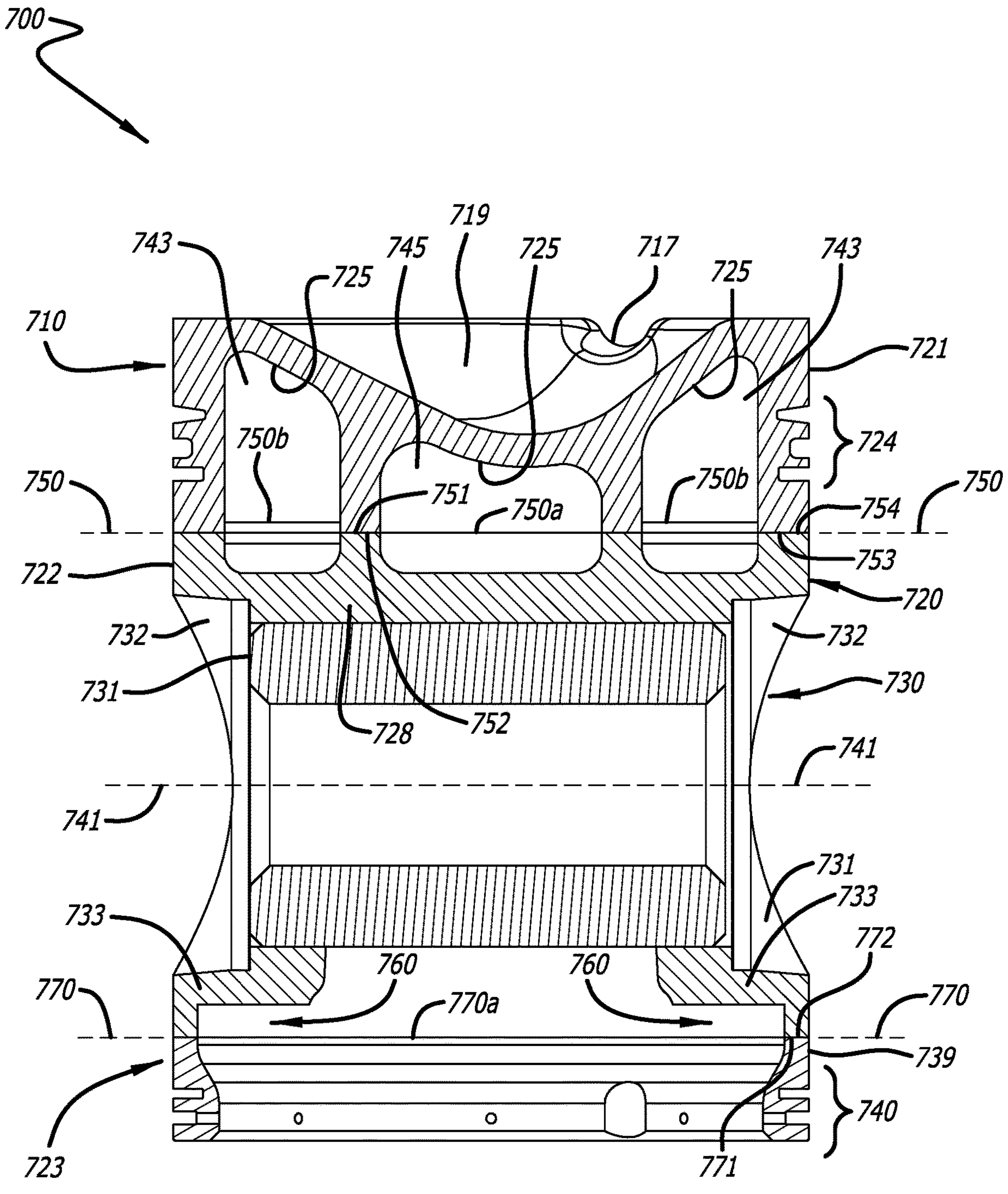
FIG. 8 is a side sectional view of the assembled piston of FIG. 7B taken along a wristpin bore axis of the piston.
Figure 9:
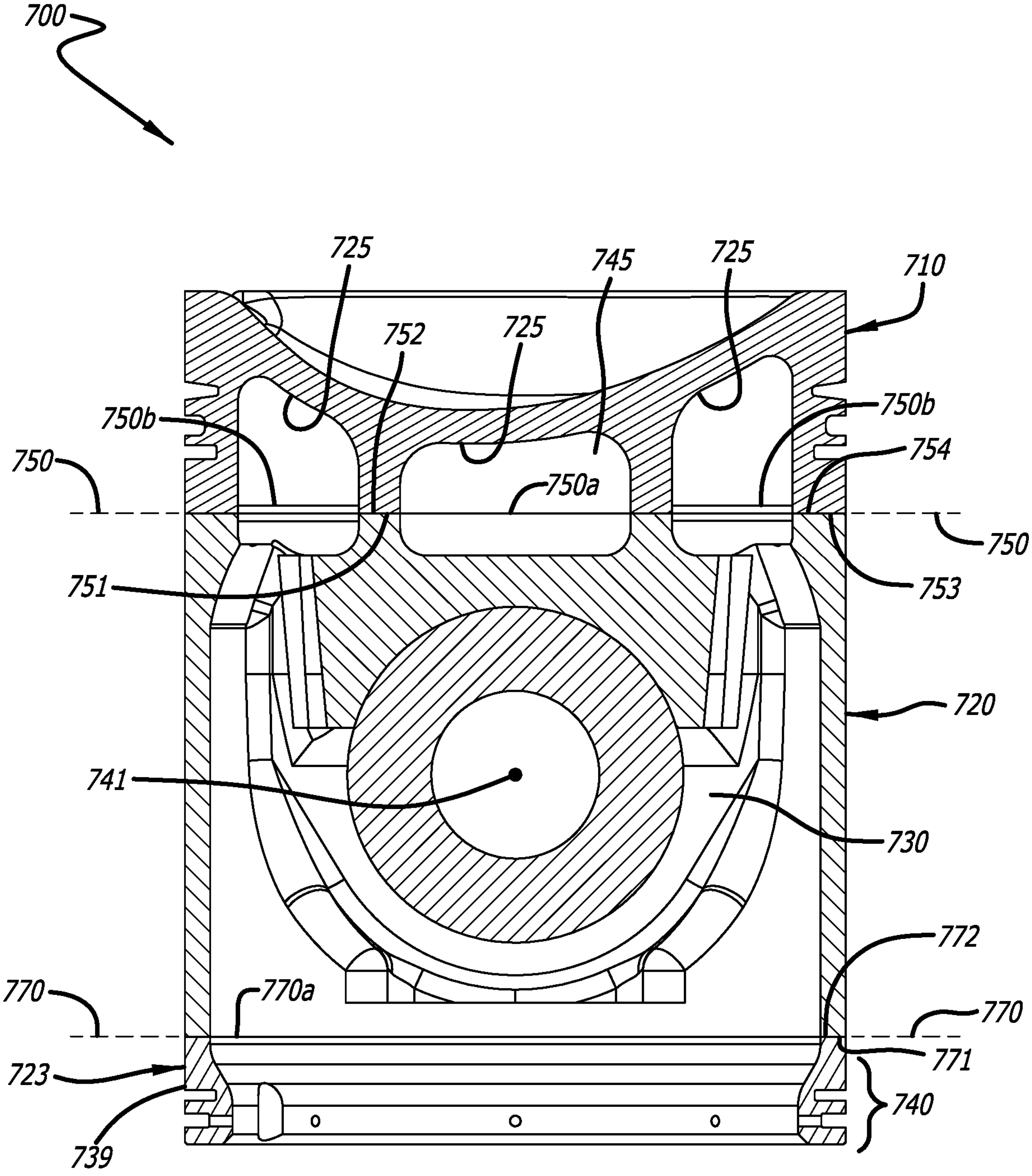
FIG. 9 is a side sectional view of the assembled piston of FIG. 7B taken transversely to the wristpin bore axis.

As shown in FIGS. 7B, 8, and 9, when the outer part 723 and the skirt part 720 are welded together, the outer ring belt region 740 defines an open outer end of the skirt part 720, and therefore, of the piston 700. With the piston 700 assembled by welding the crown part 710, skirt part 720, and outer part 723 together, the ring belt regions 724 and 740 occupy respective circumferential ends of the piston 700 that are coaxially aligned along the piston axis 701.

In FIGS. 8 and 9, a line 750 approximates preferred locations of first weld seams between the crown part 710 and the skirt part 720. The crown part 710 and the skirt part 720 can be joined (or, "connected") by one or more circumferential weld seams at circumferentially-extending joining surfaces in the vicinity of the line 750. In the example shown, there is an inner weld seam 750*a* between a radially inner circumferential surface 751 (best seen in FIG. 7A) on a circular rib extending from the interior wall 728 and a corresponding radially inner circumferential surface 752 on the undercrown 725. In the example shown, there is another inner weld seam 750*b* between a radially outer circumferential surface 753 (best seen in FIG. 7A) on a circular rib extending from the interior wall 728 and a corresponding radially outer circumferential surface 754 on the undercrown 725. Preferably, but not necessarily, the first weld seams 750*a* and 750*b* are aligned in a cut plane containing the line 750 which is orthogonal to the piston longitudinal axis 701 and are formed in the same welding step. However, other weld seam alignments and orientations are contemplated. Many techniques of welding crown and skirt parts using circumferential weld seams to form internal cooling galleries and cooling chambers are known. See, for example, U.S. Pat. No. 8,327,537 in this regard.

As seen in FIG. 8, near the second end 727 of the skirt part 720, on the interior surface of the sidewall 722 there are undercuts 760 that result from formation of the bosses 733 in the sidewall 722. The undercuts 760 can be formed by manufacturing the skirt part 720 and the outer part 723 separately, by forging for example, with the undercuts 760 formed in the skirt part 720 near the second end 727, and then welding the two parts 720 and 723 together by means of a second weld seam. For example, the skirt part 720 and the outer part 723 can be joined by a second weld seam 770*a* at circumferentially-extending joining surfaces in the vicinity of the line 770. In the example shown, the weld seam 770*a* is formed between a circumferential surface 771 (best seen in FIG. 7A) on the outer part 723 and a corresponding circumferential surface 772 on the skirt part 720 at the open end 727.

In some aspects, the crown part 710 and the skirt part 720 may have to be registered in preparation for being joined by first weld seams, as explained above with respect to FIG. 5. In other aspects, the parts 710, 720, and 723 may be fabricated and joined together by welding as described above with respect to the piston 200.

Alternate joining features: In the preceding embodiments, the crown part, skirt part, and outer part are described as being joined or connected by welding. There may be instances wherein it may be rational and useful to connect or join the parts by purely mechanical methods and means, including threading, press fitting, and so on. It may also be the case where the three parts are joined or connected by some combination of welding, threading, and press fitting.

Those skilled in the art will appreciate that the specific embodiments set forth in this specification are merely illustrative and that various modifications are possible and may be made therein without departing from the scope of the subject multi-part piston construction for an opposed-piston engine.

The invention claimed is:

1. A method of making a piston for an opposed-piston engine, comprising:

providing a crown part comprising a circumferentially-extending compression ring belt region with one or more ring grooves, an end surface shaped to define a combustion chamber with an end surface of an opposing piston of the opposed-piston engine, a bowl in the end surface, and notches in the end surface which open into the bowl through a peripheral edge of the crown part, the bowl having a longitudinal axis, the notches being spaced along the longitudinal axis of the bowl so as to be situated at opposed locations on the peripheral edge;

providing a skirt part comprising a first end, a second end, and a wristpin bore with a wristpin bore axis;

providing an outer part comprising a circumferentially-extending oil ring belt region with one or more ring grooves;

registering the crown part with respect to the skirt part such that there is a predetermined orientation between the longitudinal axis of the bowl and the wristpin bore axis;

joining the crown part to the first end of the skirt part with one or more first weld seams; and joining the second end of the skirt part to the outer part with a second weld seam.

2. The method of claim 1, in which the longitudinal axis of the bowl is oriented with respect to the wristpin bore axis by a predetermined angle of between 30 degrees and 35 degrees.

3. The method of claim 2, in which the longitudinal axis of the bowl is oriented with respect to the wristpin bore axis by a predetermined angle of 32 degrees.

4. The method of claim 2, wherein the crown part comprises a forged metal part and the skirt part comprises a forged metal part.

5. The method of claim 2, wherein the crown part comprises a forged metal part and the outer part comprises a forged metal part.

6. The method of claim 2, wherein the skirt part comprises a forged metal part and the outer part comprises a forged metal part.

7. The method of claim 2, wherein joining the crown part to the skirt part comprises one or more of friction welding, shielded active gas welding, shielded metal arc welding, gas tungsten arc welding, gas metal arc welding, flux-cored arc welding, submerged arc welding, electroslag welding, and electric resistance welding.

8. The method of claim 2, wherein joining the crown part and skirt part together comprises induction heating of the crown part and the skirt part.

9. The method of claim 2, wherein when the piston is made by welding the crown part, skirt part, and outer part together, the ring belt regions occupy respective circumferential ends of the piston that are coaxially aligned with and separated along a piston axis.

10. The method of claim 1, in which the longitudinal axis of the bowl is oriented with respect to the wristpin bore axis by a predetermined angle of between 45 degrees and 55 degrees.

11. The method of claim 10, wherein the crown part comprises a forged metal part and the skirt part comprises a forged metal part.

12. The method of claim 10, wherein the crown part comprises a forged metal part and the outer part comprises a forged metal part.

13. The method of claim 10, wherein the skirt part comprises a forged metal part and the outer part comprises a forged metal part.

14. The method of claim 10, wherein joining the crown part to the skirt part comprises one or more of friction welding, shielded active gas welding, shielded metal arc welding, gas tungsten arc welding, gas metal arc welding, flux-cored arc welding, submerged arc welding, electroslag welding, and electric resistance welding.

15. The method of claim 10, wherein joining the crown part and skirt part together comprises induction heating of the crown part and the skirt part.

16. The method of claim 10, wherein when the piston is made by welding the crown part, skirt part, and outer part together, the ring belt regions occupy respective circumferential ends of the piston that are coaxially aligned with and separated along a piston axis.

* * * * *